May 23, 1933. D. T. WILLIAMS 1,910,732
LUBRICATING DEVICE
Filed March 22, 1932
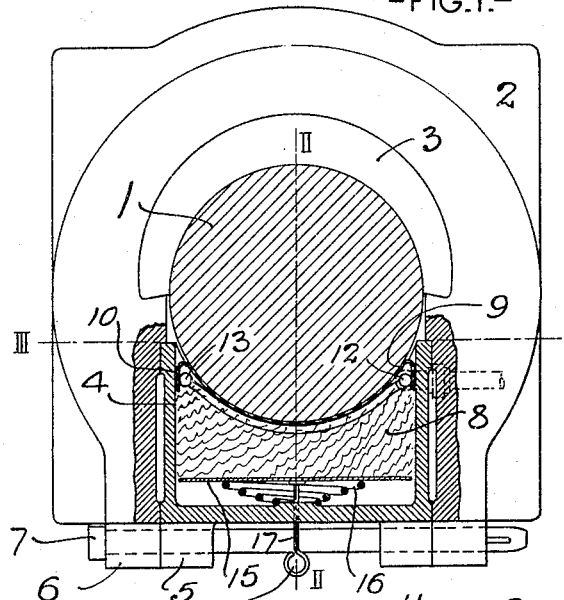
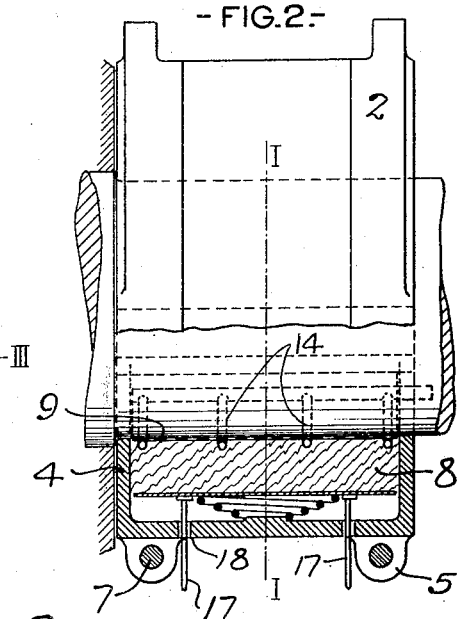
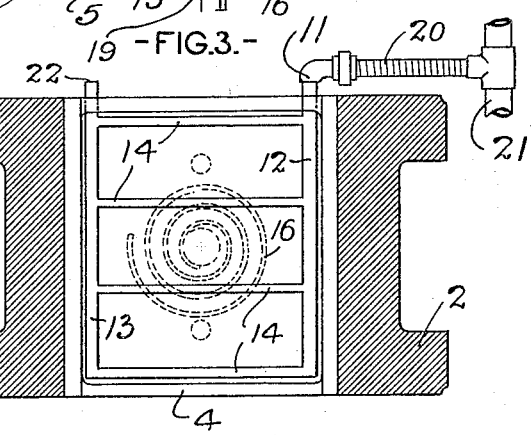
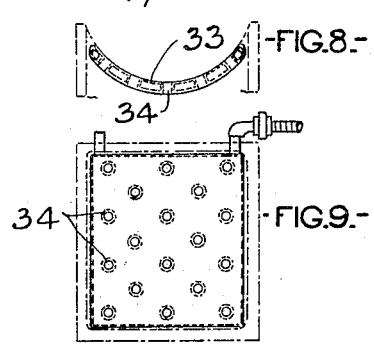
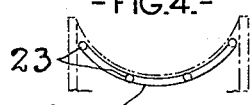
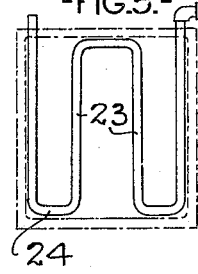
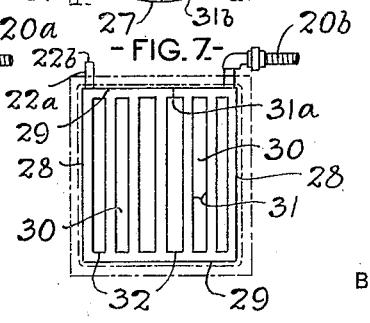
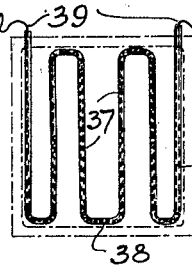
INVENTOR
David T. Williams.
BY S. C. Yeaton
ATTORNEY Patented May 23, 1933

1,910,732

UNITED STATES PATENT OFFICE

DAVID T. WILLIAMS, OF LARCHMONT, NEW YORK

LUBRICATING DEVICE

Application filed March 22, 1932. Serial No. 600,447.

This invention relates to improvements in lubricators and particularly to lubricating devices for the axle journals of railway vehicles. The invention is especially adapted for use in connection with the journal boxes of locomotive driving wheels.

In the operation of locomotives, especially switching engines, practice frequently requires them to stand idle. During cold weather after the locomotive has been standing idle, as the lubricant is hard, it is not supplied to the journals until the vehicle has run for sufficient time to generate enough frictional heat to soften the lubricant so that it will act effectively, this condition obviously resulting in inefficient operation.

The object of the present invention is to provide a lubricating device for vehicle axle journals comprising means for heating the lubricant, so that the lubricant will be softened sufficiently to be supplied to the axle at all times, regardless of the climatic conditions and whether or not the vehicle has been standing idle.

The invention is illustrated in the accompanying drawing, wherein:

Figure 1 is an end view of a journal box, the lower half being in broken vertical section on the line I—I of Fig. 2, with the lubricating device of the instant invention applied thereto; Fig. 2 is a side view of the parts shown in Fig. 1, with the lower half in vertical section on the line II—II of Fig. 1; Fig. 3 is a horizontal section on the line III—III of Fig. 1, with the cover plate removed; and Figs. 4 to 11 inclusive are views of modifications of the heaters of the present invention, Fig. 4 being a diagrammatic end view of one modified form of the heater, Fig. 5, a plan of the parts shown in Fig. 4, with the cover plate removed, Fig. 6, a diagrammatic end view of a second modified form of heater, Fig. 7, a plan of the parts shown in Fig. 6, Fig. 8, a diagrammatic end view of a third modified form of heater, Fig. 9, a plan of the parts shown in Fig. 8, Fig. 10, a diagrammatic end view of a fourth modified form of heater, and Fig. 11, a plan of the parts shown in Fig. 10 with the cover plate removed.

Referring in detail to the drawing, the present invention is illustrated as applied in connection with a journal 1, of a locomotive axle. A journal box, indicated generally by the numeral 2, is applied to the journal 1. The journal box is of the usual well-known construction and comprises a bearing 3, and a lubricant or grease cellar 4, which is held in place by means of sets of lugs 5, formed on the bottom of the cellar and coinciding sets of lugs 6, formed on the journal box through which lugs suitable bolts 7 are passed. The cellar 4 is, as in usual practice, adapted to contain a solid lubricant block 8. The lubricant block is of such size as to fit evenly within the cellar and is provided with an upper surface curved transversely of its length to conform to the curvature of the axle journal.

In the form of the invention illustrated in Figs. 1 to 3, a cover plate 9, consisting of a perforated metal plate curved transversely of its length, similarly to the lubricant block, so as to conform to the curvature of the axle journal, is disposed within the lubricant cellar. At the sides of the curved portion of the cover plate, downwardly extending flanges 10 are provided, which flanges bear against the inner surfaces of the side walls of the lubricant cellar.

A heater, indicated generally by the numeral 11, is provided for the device. The heater comprises parallel longitudinal side conduits or pipe elements 12 and 13, which are connected by a plurality of transverse conduits or pipe elements 14, the latter being curved to conform with the surface of the axle journal. The lubricant block 8 is pressed up against the cover plate 9, with the transverse pipe elements 14 extending into its upper surface. A sliding bottom 15 is provided in the lower part of the cellar beneath the lubricant, and a conical spiral spring 16 is disposed between the bottom of the cellar and the sliding bottom 15. The apex of the spring bears against the bottom of the cellar, and its upper coil impinges upon the sliding bottom 15, thereby constraining the sliding bottom and the lubricant block upwardly against the heater and the cover plate 9, the cover plate in turn bearing against the lower surface of the axle journal. A flexible supply pipe 20 is connected to the longitudinal side pipe element 12 of the heater, the supply pipe being in turn connected with a source of steam (not shown) through suitable piping connections 21. The side pipe 13 extends outwardly beyond the journal box, at one end, which end is closed except for a leak hole indicated at 22. The steam is allowed to leak slowly through the hole 22, so that a circulation may be maintained, when desired, through all of the pipe elements of the heater.

As in usual practice, a pair of guide pins 17 is secured to the sliding bottom 15, and extends downwardly through holes 18 formed in the bottom of the cellar, the pins having eyes 19 formed on their lower ends. By means of the pins, the bottom 15 is guided, and the amount of lubricant within the cellar, at any given time, may be determined by noting the relative amount of the pins which are extended beneath the bottom of the journal box. The spring 16 is always contracted to some extent, and as lubricant is used up and the block gradually becomes thinner and lighter, the spring becomes elongated, and being under less strain, consequently effects a weaker constraint upon the bottom 15 so that lubricant is forced toward the axle by substantially the same pressure regardless of the thickness of the lubricant block.

In Figs. 4 and 5, there is illustrated a modified form of heater, which is applied similarly to the heater of the form aforedescribed. This heater, however, comprises a plurality of reaches of pipe 23, which extend longitudinally beneath the cover plate 9 of the device, and which are connected by transverse sections 24, which sections are suitably curved to conform with the surface of the axle journal as illustrated. A supply pipe 20a is connected to one of the side reaches 23, and the other side reach is provided with a projecting closed end having a leak hole similarly to the supply pipe 20 and side pipe elements 12 and 13 respectively of the first described embodiment. The operation of this modification is the same as that of the first described form of the invention.

A second modified form of heater is illustrated in Figs. 6 and 7. Here the heater, indicated generally by the numeral 25, is substantially different in construction from the first described embodiment, and the cover plate 9 is not required in connection therewith. The heater 25 comprises an oblong box-shaped structure curved transversely of its length to conform with the curvature of the axle journal 1. The heater is provided with upper and lower walls 26 and 27 respectively, side walls 28 and end walls 29. A plurality of longitudinal slots 30 are formed in the upper wall parallel with the side walls 28. At the opposite longitudinal edges of the slots, longitudinal slanting walls 31 are provided, and a plurality of walls 32 are disposed at the ends of the slots parallel to the end walls 29. The longitudinal walls 31 are arranged in downwardly converging pairs, spaced at their lower edges, so as to provide longitudinal conduits which are V-shaped in cross section. It will thus be apparent that the heater 25 provides a plurality of parallel longitudinal passageways connected by end passageways. A wall 31a is disposed transversely across the end passageway at one end of the heater. A supply pipe 20b, is connected at one corner of the heater on one side of the wall 31a, and an exhaust pipe 22a is connected at another corner on an opposite side of the wall 31a, the exhaust pipe being formed, at its end, with a leak hole 22b for the same purpose as the leak hole 22 of the pipe element 13 of the first described embodiment. By reason of the arrangement of the walls, it will be apparent that steam, entering from the supply pipe 20b will be circulated through the passageways, from the inlet end of the heater to the opposite end and back to the exhaust pipe. The V-shaped arrangement of the pairs of walls 31 provides a plurality of edges 31b on the under side of the heater which will bear against the lubricant block and act as cutting edges on the block, and in operation the lubricant will pass up through the openings 30, between the longitudinal walls, from the block to the axle journal. It will, of course, be understood that any desired wall arrangement may be provided within the heater, which arrangement will insure proper circulation through the heater in the most efficient manner.

A third modified form of heater, indicated generally by the numeral 33, is illustrated in Figs. 8 and 9. This heater is similar in its application within the journal box, to the heater last described with reference to Figs. 6 and 7. Here the heater comprises a box-shaped structure curved transversely of its length to conform with the curvature of the axle journal. The inner slanting wall and slot arrangement of the last described embodiment is eliminated, and a plurality of tubes 34 is provided in lieu thereof. The tubes are passed transversely through the heater so as to permit the lubricant on the under side thereof to pass therethrough from the bottom of the heater to the upper side thereof which bears against the surface of the axle journal.

A fourth modified form of heater indicated generally by the numeral 35, is illustrated in Figs. 10 and 11. This heater is applied similarly to the heater illustrated in Figs. 1 to 3, employing the upper cover plate 9. The heater 35 comprises a conduit of suitable insulating material 36 arranged in longitudinal reaches 37 which extend beneath the cover plate 9 and are connected by sections 38, curved so as to conform with the surface of the cover plate. An electric resistance wire is passed through the insulating conduit and is connected at its terminals 39 with wires 40, which are in turn connected with a source of electric current and means (not shown) for making and breaking the circuit through the resistance wire. The source of current may be storage batteries or the electric generation system of the locomotive, or any other suitable means, and the circuit maker and breaker may be any suitable well-known type of electric circuit control switch. When the circuit is made, the current passes through the resistance wire which thus becomes heated, and in turn heats the lubricant.

It will be seen from the foregoing, that the present invention provides means which are readily applicable to existing journal boxes, whereby the lubricant carried therein may be heated when desired and thus those periods, subsequent to the vehicle having remained idle in cold weather, when proper lubrication of the axle journals is not effected, are eliminated.

It will be understood that while certain embodiments of the invention have been hereinbefore described, this invention is not to be limited thereby, but that all and any of the various changes and modifications in form, structure, arrangement of parts, and types of heaters, which may be made without departing from the spirit of the invention, and which fall within the scope of the appended claims, are contemplated as a part of the present invention.

The invention claimed and desired to be secured by Letters Patent is:

1. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and journal; and means adapted to be heated, positioned in said cellar to engage the upper curved wall of said block for softening said wall.

2. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and journal; and means of the same curvature as said curved wall of the block, adapted to be heated, positioned in said cellar to engage said curved wall of the block for softening said wall.

3. A journal lubricating device, comprising a journal box cellar adapted to retain in vertical sliding engagement therewith a block of lubricant; a perforated cover having a curved wall of the same curvature as the journal for which the device is adapted, disposed within said cellar to be adjacent said journal; means for yieldingly forcing said block of lubricant upwardly against said cover; and means adapted to be heated, positioned in said cellar to engage the upper wall of said block beneath and adjacent said cover for softening said wall.

4. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and said journal; means for containing steam for heating, positioned in said cellar to engage the upper curved wall of said block for softening said wall; and means for supplying steam to said steam containing means.

5. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and said journal; means adapted to be electrically heated, positioned in said cellar to engage the upper curved wall of said block for softening said wall; and means for supplying electric current to said means adapted to be heated.

6. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and said journal; and means adapted to be heated, positioned in said cellar and having reaches extending longitudinally and curved connecting reaches for said longitudinal reaches of the same curvature as the curved wall of said block, said means being adapted to engage said curved wall, for softening said wall.

7. A journal lubricating device, comprising a journal box cellar adapted to retain in vertical sliding engagement therewith a block of lubricant having an upper curved wall of the same curvature as the journal for which the device is adapted; means for yieldingly forcing the block of lubricant upwardly for maintaining a constant relation between said block and said journal; means for containing steam for heating, having longitudinal reaches and connecting reaches therefor, a steam inlet, a steam outlet and means partitioning said reaches to effect circulation of steam throughout said reaches from said inlet to said outlet, said steam containing means being positioned in said cellar and said connecting reaches being curved to engage the upper curved wall of said block, for softening said wall; and means for supplying steam to said steam containing means.

8. A journal lubricating device, comprising a journal box cellar adapted to retain in vertical sliding engagement therewith a block of lubricant having an upper curved wall of the same curvature as the journal for which the device is adapted; means for containing steam for heating, having a chamber of the same curvature as said wall, positioned in said cellar to be adjacent said journal; means for yieldingly forcing the block of lubricant upwardly against said steam containing means, said steam containing means being provided with vertical passageways therethrough to permit the passage of softened lubricant of said block therethrough to said journal; and means for supplying steam to said steam containing means for heating, to soften said wall.

DAVID T. WILLIAMS.